US008407786B1

(12) United States Patent
Elias et al.

(10) Patent No.: US 8,407,786 B1
(45) Date of Patent: *Mar. 26, 2013

(54) SYSTEM, METHOD, AND COMPUTER PROGRAM PRODUCT FOR DISPLAYING THE RATING ON AN ELECTRONIC MAIL MESSAGE IN A USER-CONFIGURABLE MANNER

(75) Inventors: Mohamed Atiq Elias, Bangalore (IN); Santhosh Kumar Edukulla, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 872 days.

This patent is subject to a terminal disclaimer.

(21) Appl. No.: 12/142,537

(22) Filed: Jun. 19, 2008

(51) Int. Cl.
*G06F 11/00* (2006.01)
*G06F 15/16* (2006.01)

(52) U.S. Cl. .......................... 726/22; 709/206
(58) Field of Classification Search .............. 726/22; 709/206
See application file for complete search history.

(56) References Cited

U.S. PATENT DOCUMENTS

| | | | |
|---|---|---|---|
| 5,436,780 A | 7/1995 | Nagata et al. | 360/121 |
| 6,038,108 A | 3/2000 | Dee et al. | 360/121 |
| 7,092,992 B1* | 8/2006 | Yu | 709/206 |
| 7,266,880 B2 | 9/2007 | Biskeborn et al. | 29/603.15 |
| 7,542,993 B2* | 6/2009 | Satterfield et al. | 1/1 |
| 2003/0204569 A1* | 10/2003 | Andrews et al. | 709/206 |
| 2005/0081059 A1* | 4/2005 | Bandini et al. | 713/201 |
| 2006/0095524 A1* | 5/2006 | Kay et al. | 709/206 |
| 2006/0168057 A1* | 7/2006 | Warren et al. | 709/206 |
| 2006/0253458 A1 | 11/2006 | Dixon et al. | 707/10 |
| 2006/0253578 A1 | 11/2006 | Dixon et al. | 709/225 |
| 2006/0253579 A1 | 11/2006 | Dixon et al. | 709/225 |
| 2006/0253580 A1 | 11/2006 | Dixon et al. | 709/225 |
| 2006/0253581 A1 | 11/2006 | Dixon et al. | 709/225 |
| 2006/0253582 A1 | 11/2006 | Dixon et al. | 709/225 |
| 2006/0253583 A1 | 11/2006 | Dixon et al. | 709/225 |
| 2006/0253584 A1 | 11/2006 | Dixon et al. | 709/225 |
| 2007/0005716 A1 | 1/2007 | LeVasseur et al. | 709/206 |
| 2007/0214220 A1* | 9/2007 | Alsop et al. | 709/206 |
| 2008/0086503 A1* | 4/2008 | Frank et al. | 707/104.1 |

OTHER PUBLICATIONS

"Email Reputation Services: Stops Email Threats Before the Gateway," Trend Micro Incorporated, 2007.
"McAfee SiteAdvisor: McAfee System and Messaging Protection," McAfee, Inc., copyright 2003-2008.
U.S. Appl. No. 11/968,983, filed Jan. 3, 2008.
"McAfee SiteAdvisor," McAfee, Inc., copyright 2008, http://www.siteadvisor.com/.

\* cited by examiner

*Primary Examiner* — Kambiz Zand
*Assistant Examiner* — Teshome Hailu
(74) *Attorney, Agent, or Firm* — Wong, Cabello, Lutsch, Rutherford & Brucculeri, LLP.

(57) ABSTRACT

A system, method, and computer program product are provided for displaying an electronic mail message in a user-configurable manner. In use, an electronic mail message is identified. Additionally, a risk of the electronic mail message is rated based on predefined criteria. Furthermore, the electronic mail message is displayed in a user-configurable manner based on the rating.

18 Claims, 6 Drawing Sheets

SYSTEM, METHOD, AND COMPUTER PROGRAM PRODUCT FOR DISPLAYING THE RATING ON AN ELECTRONIC MAIL MESSAGE IN A USER-CONFIGURABLE MANNER

FIELD OF THE INVENTION

The present invention relates to electronic mail messages, and more particularly to displaying electronic mail messages.

BACKGROUND

Traditionally, electronic mail messages have been displayed utilizing electronic mail message applications. Such electronic mail message applications have allowed users to select an electronic mail message for viewing purposes. However, techniques generally employed by electronic mail message applications for displaying electronic mail messages have generally exhibited various limitations. Just by way of example, display options for electronic mail messages determined to at least potentially pose a risk of unwanted activity have been limited.

There is thus a need for addressing these and/or other issues associated with the prior art.

SUMMARY

A system, method, and computer program product are provided for displaying an electronic mail message in a user-configurable manner. In use, an electronic mail message is identified. Additionally, a risk of the electronic mail message is rated based on predefined criteria. Furthermore, the electronic mail message is displayed in a user-configurable manner based on the rating.

DETAILED DESCRIPTION

Figure 1:
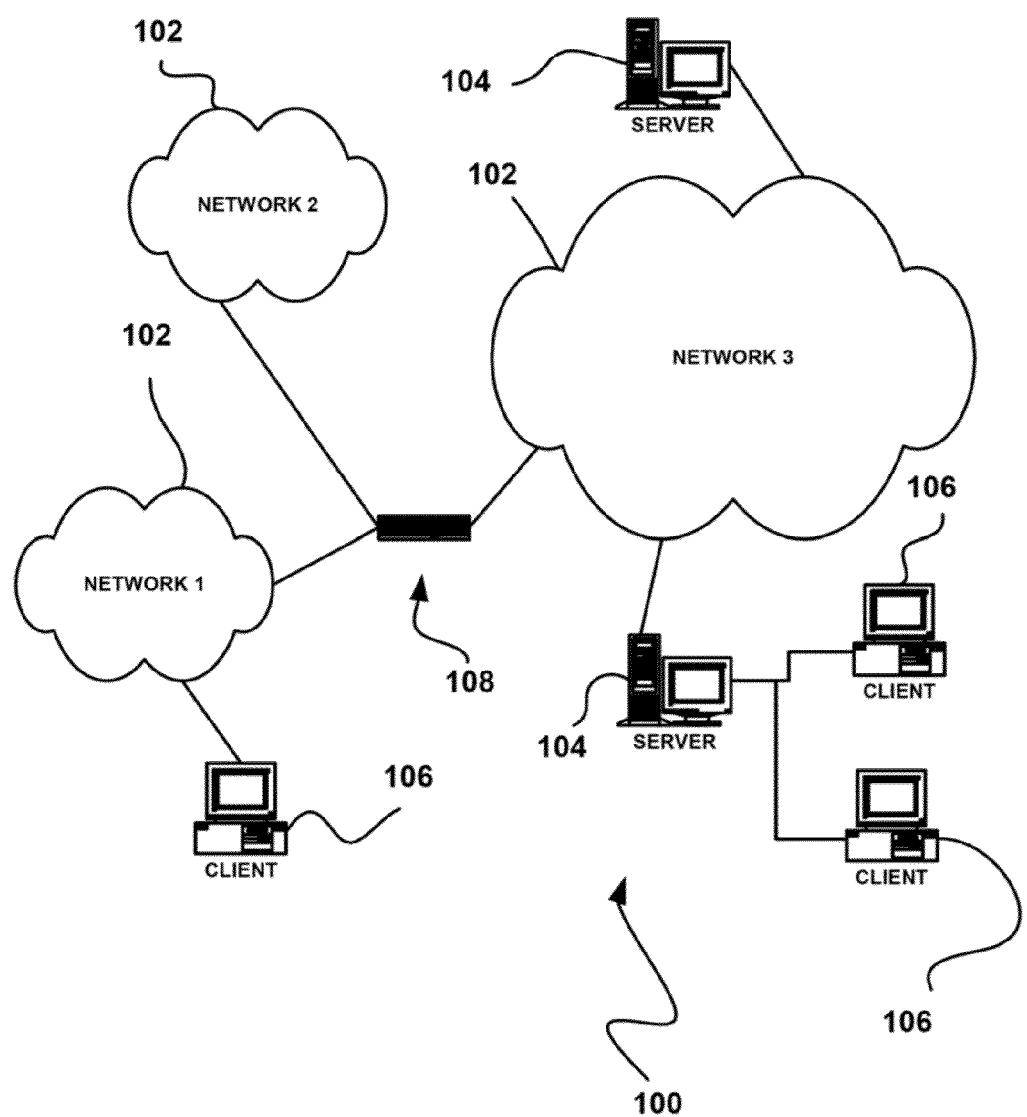
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
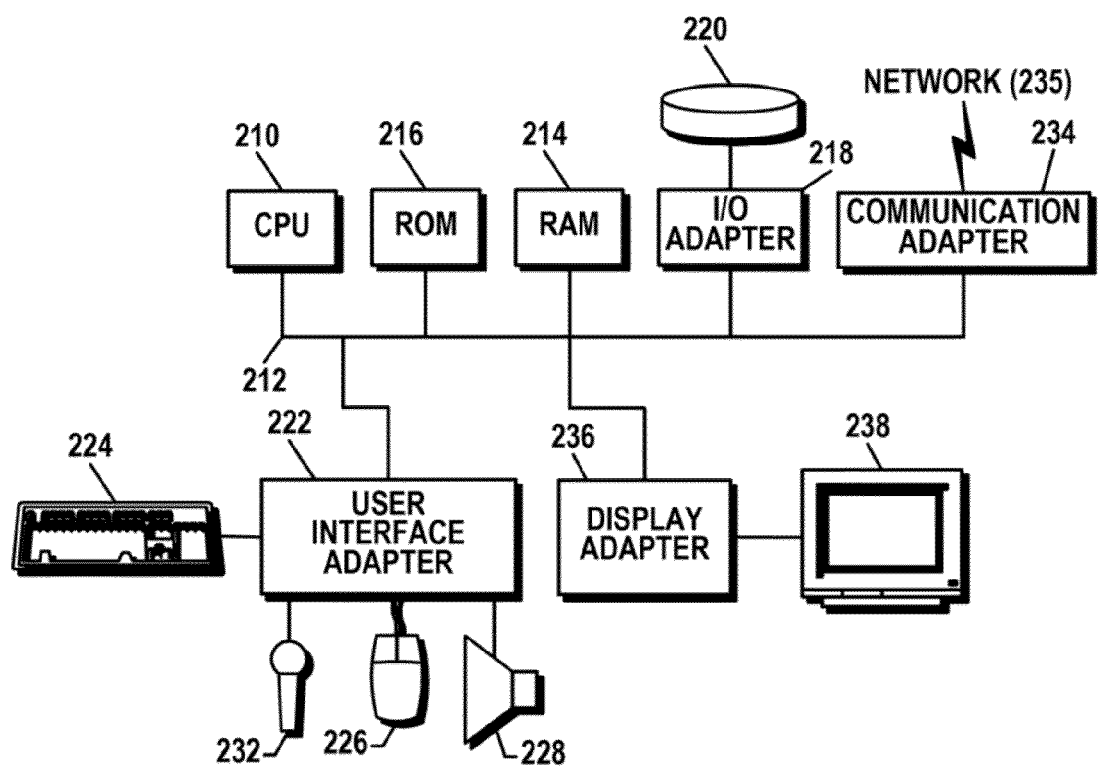
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
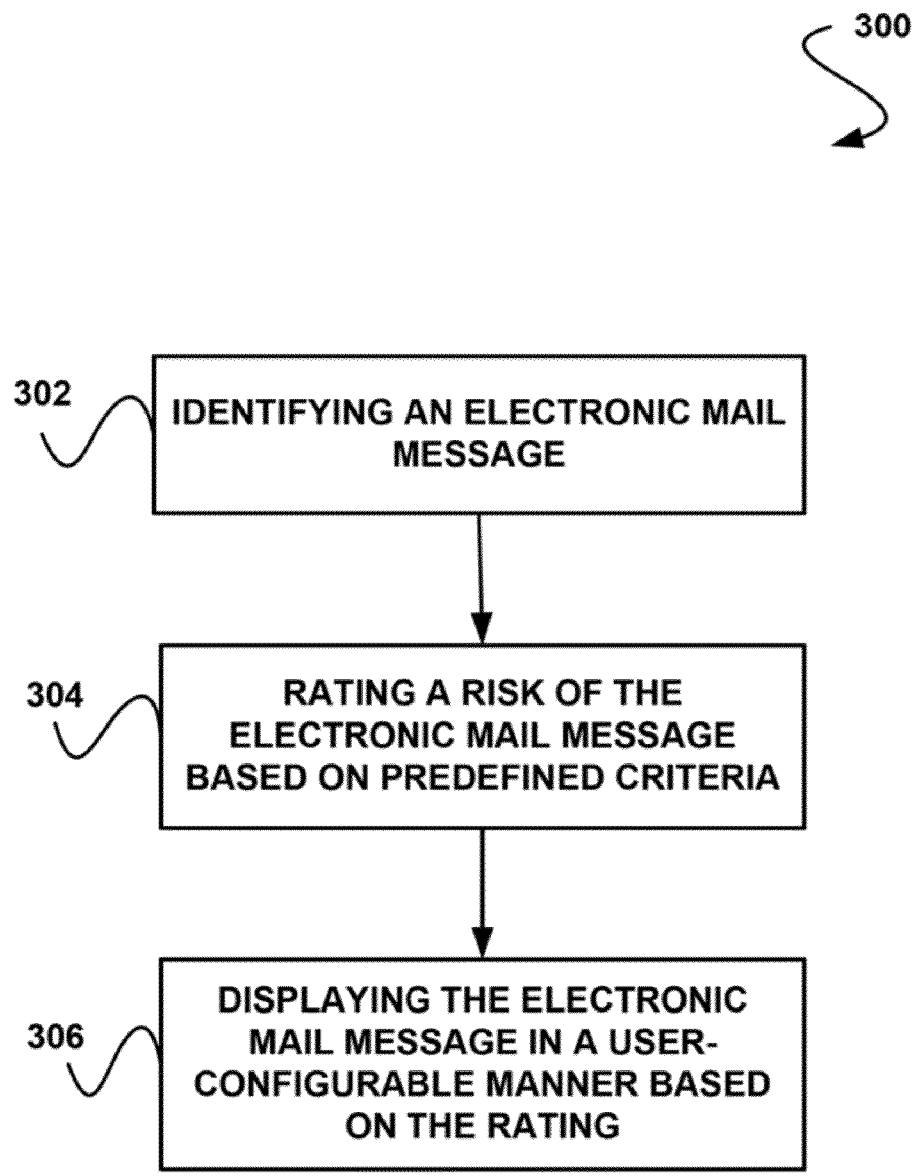
FIG. 3 shows a method for displaying an electronic mail message (e-mail) in a user-configurable manner, in accordance with one embodiment.

FIG. 3 shows a method 300 for displaying an electronic mail message (e-mail) in a user-configurable manner, in accordance with one embodiment. As an option, the method 300 may be carried out in the context of the architecture and environment of FIGS. 1 and/or 2. Of course, however, the method 300 may be carried out in any desired environment.

As shown in operation 302, an e-mail message is identified. With respect to the present description, the e-mail message may include any message capable of being communicated via electronic mail. For example, the e-mail message may be sent and/or received (e.g. over a network) via an electronic mail application.

As an option, the e-mail message may include an unrated e-mail message. Just by way of example, the e-mail message may be unrated with respect to a risk of the e-mail message. Such risk may include a risk (e.g. probability, etc.) that the e-mail message includes unwanted data (e.g. malware, etc.), a risk that the e-mail message is capable of being utilized to perform unwanted activity (e.g. capable of being executed for performing the unwanted activity), etc. The e-mail message may optionally be unrated such that a risk of the e-mail message has not previously been rated.

In one embodiment, the e-mail message may be identified in response to receipt of the e-mail message by a recipient. The recipient may include the destination device to which the e-mail message is destined, for example. Of course, however, the recipient may include any device that receives the e-mail message.

In another embodiment, the e-mail message may be identified based on a periodic scan for unrated e-mail messages. The scan may be a scan of an e-mail repository utilized by the e-mail application to store e-mail messages (e.g. received e-mail messages, unsent e-mail messages, drafted e-mail messages, etc.), as an option. As another option, the scan may be periodically performed according to a schedule, such as a user-defined schedule.

Additionally, as shown in operation 304, a risk of the e-mail message is rated based on predefined criteria. In one embodiment, the e-mail message may be rated by the device that identified in the e-mail message (in operation 302). In another embodiment, the e-mail message may be rated by a security application installed on such device.

As noted above, in various embodiments, the risk of the e-mail message may include a risk that the e-mail message includes unwanted data, is capable of being utilized to perform unwanted activity, etc. Thus, rating the risk of the e-mail message may include determining (e.g. calculating, etc.) an indicator of the risk of the e-mail message. Such indicator may include a value within a range of values.

In one embodiment, the risk of the e-mail message may be rated based on the predefined criteria utilizing a predetermined rating scheme. Just by way of example, a rating for each of the predefined criteria may be determined, based on the e-mail message (e.g. characteristics of the e-mail message, etc.). Further, the risk of the e-mail message may be rated by aggregating (e.g. summing, etc.) each of the determined ratings.

As an option, at least a portion of the predefined criteria based on which the e-mail message is rated may be configured by a user. The user may include a user of the device via which the e-mail message is identified. As another option, the predefined criteria may be configured by an administrator of a network on which the device is located. As yet another option, the predefined criteria may be configured by a provider of the security application.

In one embodiment, the predefined criteria may include a source of the e-mail message. For example, the rating of the risk may be based on whether the source of the e-mail message is determined to be trusted, an extent to which the source of the e-mail is determined to be trusted, etc. As an option, the e-mail message may be rated with a lower risk if the source of the e-mail message is trusted than if the source of the e-mail message is not trusted.

Moreover, the source of the e-mail message may be determined to be trusted if the source is included in a predefined contacts list (e.g. a predefined list of sources). As another option, the source of the e-mail message may be determined to be untrusted if the source is included in a predefined list of contacts to be blocked. The predefined contacts list and/or the predefined list of contacts to be blocked may be configured by a user of the e-mail application, for example.

As yet another option, the source of the e-mail message may be determined to be trusted if the source has replied to e-mail messages received by the device a threshold number of times. As a further option, the source of the e-mail message may be determined to be untrusted if the source is included in a list of known unwanted sources (e.g. sources predetermined to be senders of unwanted data, etc.). In other examples, the source of the e-mail message may be determined to be trusted based on a domain name associated with such source, an authentication of the source, etc.

In another embodiment, the predefined criteria may include a digital signature associated with the e-mail message. As an option, the risk of the e-mail message may be rated based on whether the e-mail message is digitally signed. For example, the risk of the e-mail message may be rated based on whether the e-mail message is digitally signed using a predetermined (e.g. public, known, etc.) certificate authority.

In yet another embodiment, the predefined criteria may include content of the e-mail message. The content may include images, links (e.g. hyperlinks), etc. included in the e-mail message. For example, if the content of the e-mail message includes content predetermined to be unwanted, the e-mail may be rated with a higher risk rating than if the e-mail message does not include content predetermined to be unwanted.

In still yet another embodiment, the predefined criteria may include an attachment of the e-mail message. To this end, the rating of the e-mail message may optionally be based on whether the e-mail message includes the attachment, a type of the attachment of the e-mail message, etc. Just by way of example, the rating may be based on whether the attachment to the e-mail message includes an executable file. Of course, while various types of predefined criteria have been described above, it should be noted that any desired type of predefined criteria may be utilized rating the risk of the e-mail message.

In addition, as shown in operation 306, the e-mail message is displayed in a user-configurable manner based on the rating. For example, the e-mail message may be displayed via the e-mail application. As another example, the e-mail message may be displayed via a display of the device utilized to identify the e-mail message.

In one embodiment, the e-mail message may be displayed in a user-configurable manner by displaying the e-mail message according to a user configuration. The user configuration may optionally indicate at least one rule associated with the rating that indicates a manner in which the e-mail message is to be displayed. Thus, if the rating meets the criteria of the rule, the e-mail message may be displayed according to the rule.

Just by way of example, displaying the e-mail message in the user-configurable manner may include displaying the e-mail message in a folder selected based on the user configuration (e.g. the rule). The folder may be selected from a plurality of folders presented via the e-mail application. In various embodiments, the folder may be selected from an inbox folder, a junk mail folder, a deleted items folder, etc.

As another example, displaying the e-mail message in the user-configurable manner may include conditionally displaying the e-mail message based on the rating. As an option, the user configuration may indicate that the e-mail message is only to be displayed if the rating is below a threshold. Thus, if the rating of the e-mail message meets the threshold, the e-mail message may be prevented from being displayed.

As another example, displaying the e-mail message in the user-configurable manner may include displaying a rank selected from a plurality of ranks in association with the e-mail message. In one embodiment, the user configuration may predefine ranks for each of a plurality of ranges of ratings of risk capable of being associated with e-mail messages. In this way, the rank displayed in association with the e-mail message may be selected based on the range of ratings within which the rating of the e-mail message is included.

It should be noted that while various examples of displaying the e-mail message in the user-configurable manner have been described above, the e-mail message may be displayed in any user-configurable manner that is based on the rating of the e-mail message. To this end, the risk of the e-mail message may be rated, such that the e-mail message may be displayed in a user-configurable manner that is based on such rating.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4A:
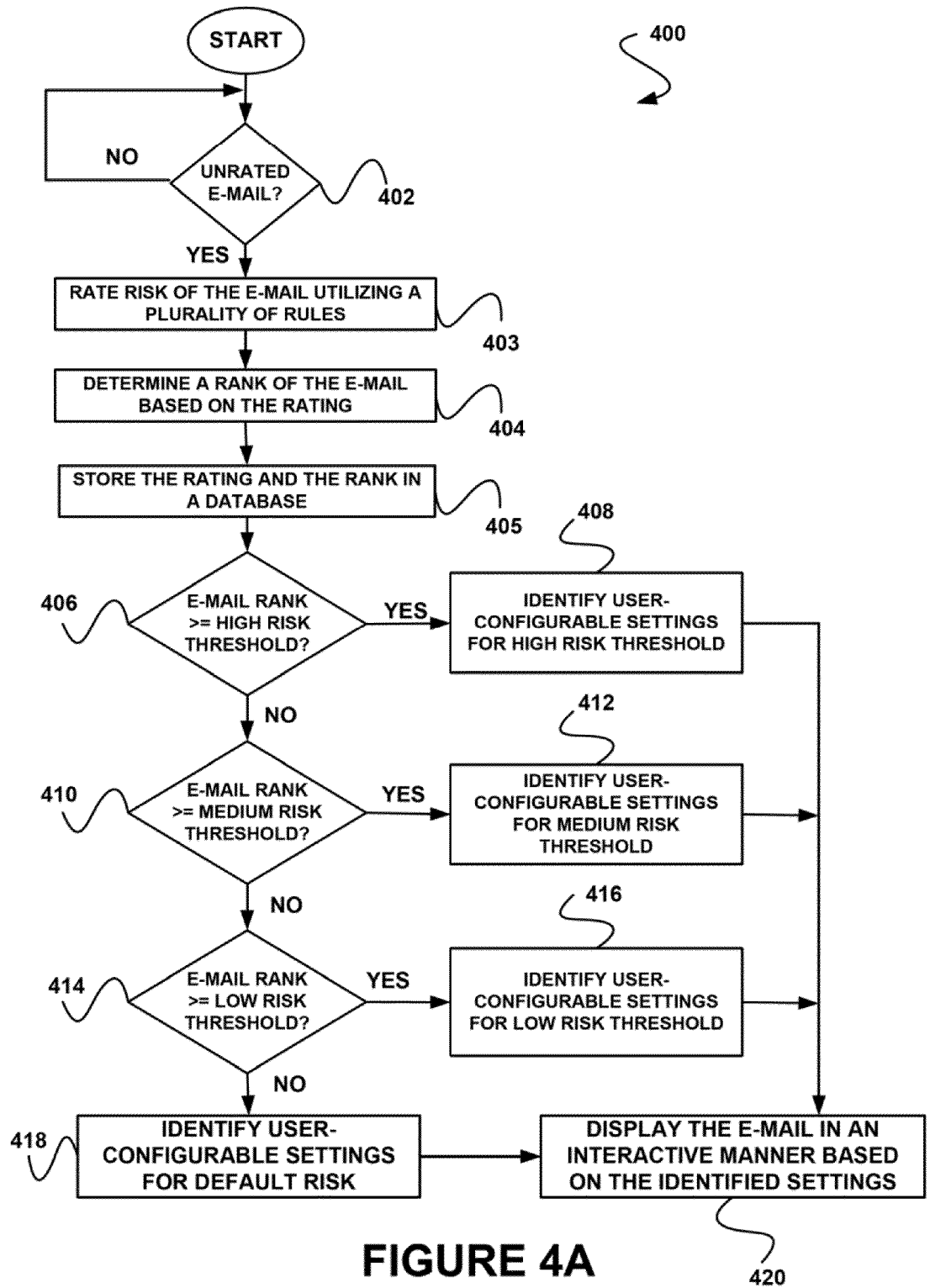
FIG. 4A shows a method for displaying an e-mail in an interactive manner based on user-configurable settings, in accordance with another embodiment.

FIG. 4A shows a method 400 for displaying an e-mail in an interactive manner based on user-configurable settings, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether an unrated e-mail message exists. With respect to the present embodiment, the unrated e-mail message may include any e-mail message which has not previously been rated. As an option, it may be determined whether an unrated e-mail message exists in an e-mail repository of an e-mail application utilized for storing received e-mail messages, unsent e-mail messages, etc.

In one embodiment, the determination may be made in response to receipt of the e-mail message at a destination device. In another embodiment, the determination may be made periodically based on a schedule. Of course, however, the determination may be made based on any desired parameter.

If it is determined that an unrated e-mail message does not exist, the method 400 waits for a determination that an unrated e-mail message does exists. Once it is determined that an unrated e-mail message exists, a risk of the e-mail message is rated utilizing a plurality of rules. Note operation 403. For example, each of the rules may be associated with a different predefined criterion.

The predefined criteria may include criteria indicating various characteristics of the e-mail message, as an option. As another option, for each predetermined criteria that applies to the e-mail message, as associated rule may be utilized to rate the e-mail message. Accordingly, a plurality rates (e.g. numerical values, etc.) may be determined for the e-mail message, each rate determined utilizing one of the rules. As an option, a higher rate may be associated with a higher risk than the risk associated with a lower rate. Further, the determined rates may be aggregated or combined in any other manner for rating the risk of the e-mail message.

In one embodiment, a rule may indicate that e-mail messages from sources that are included in contact lists of the users to which such e-mail messages are destined are to be rated with a first particular rate. In addition, the rule may indicate that -mail messages from sources that are not included in such contact lists are to be rated with a second particular rate. As an option, the first particular rate may be lower than the second particular rate, for indicating that e-mail messages from sources that are included in contact lists are associated with a lower risk than e-mail messages received from sources that are not included in contacts lists.

In another embodiment, a rule may indicate that e-mail messages from sources that are included in a list of contacts from which e-mail messages are to be blocked are rated with a first particular rate. The rule may further indicate that e-mail messages from sources that are not included in such list of contacts from which e-mail messages are to be blocked are rated with a second particular rate. The first particular rate may be greater than the second particular rate for indicating that e-mail messages from sources that are included in the list of contacts from which e-mail messages are to be blocked are associated with a greater risk than e-mail messages received from sources that are not included in the list of contacts from which e-mail messages are to be blocked.

In yet another embodiment, a rule may indicate that e-mail messages from sources included in an available distribution list of the user are rated with a first particular rate that is lower (e.g. indicating a lower risk) than a second particular rate for e-mail messages from sources not included in such available distribution list. In still yet another embodiment, a rule may indicate that e-mail messages from sources that have previously replied a threshold number of times to e-mail messages received by the destined user are rated with a first particular rate that is lower than a second particular rate for e-mail messages from sources that have not previously replied the threshold number of times to e-mail messages received by the destined user.

In still yet another embodiment, a rule may indicate that e-mail messages that are digitally signed are rated with a first particular rate that is lower than a second particular rate for e-mail messages that are not digitally signed. Such rule may further designate that e-mail messages digitally signed by certificate authorities predetermined to be trusted are rated with a higher rate than the rate for e-mail messages that are not digitally signed by such certificate authorities. In another embodiment, a rule may indicate that e-mail messages from sources included in a list of known unwanted sources (e.g. known sources of unwanted data, such as unsolicited data, phishing data, etc.) are rated with a higher rate than e-mail messages from sources other than those included in the list of known unwanted sources.

In a further embodiment, a rule may indicate that e-mail messages from sources with domain names predetermined to be untrusted (e.g. associated with unwanted data) are rated with a higher rate than e-mail messages from sources with domain names other than those predetermined to be untrusted, e-mail messages from sources with domain names predetermined to be trusted (e.g. not associated with unwanted data, etc.), e-mail messages from sources for which the trustworthiness is unknown, etc. In another embodiment, a rule may indicate that e-mail messages from sources [e.g. domain names of such sources, Internet protocol (IP) addresses of such sources, etc.] that are authenticated (e.g. valid) are rated with a higher rate than the rate of e-mail messages from sources that are not authenticated. Verifying such authentication may allow for rating the e-mail message based on whether the e-mail message is from a source that is spoofing another source.

In yet another embodiment, various rules may rate the e-mail message based on whether a body of the e-mail message includes authenticated hyperlinks, whether the e-mail message utilizes secure/multipurpose Internet mail extensions (SMIME) and/or Pretty Good Privacy (PGP), whether the body of the e-mail message includes flash and/or pop-ups, whether the content in the body of the e-mail message is authentic (e.g. determining utilizing anti-spamming techniques, etc.), etc. As another option, a rule may rate the e-mail message based on a type (e.g. format, etc.) of attachment included with the e-mail message. For example, if the e-mail message includes a script file attachment or any other unknown file type attachment, the e-mail message may be rated with a higher rate than if the e-mail message includes known types of attachments, such as image type attachments, etc. As another example, if the e-mail message includes an attachment that includes unwanted data (e.g. based on anti-virus scanning of the attachment, etc.), the e-mail message may be rated with a higher rate than if the e-mail message includes an attachment that does not include the unwanted data.

In one embodiment, a rule may indicate that e-mail messages with checksums (e.g. hashes) that are determined to be invalid (e.g. that match a checksum of data predetermined to be unwanted) are rated with a higher rate than e-mail messages with checksums that are determined to be valid. Such determination may be made utilizing a message authentication. In other embodiments, various rules may indicate that e-mail messages including unwanted data (e.g. malware, spyware, etc.) are rated with a higher rate than the rate for e-mail messages that do not include unwanted data.

In another embodiment, a rule may indicate that e-mail messages from sources that pass a challenge response test (e.g. provided by a mail server, etc.) may be rated with a lower rate than the rate for e-mail messages from sources that do not pass the challenge response test. The challenge response test may include sending an e-mail message to the source requesting a reply from the source and determining whether the source replies. The source may pass if the source replies to the e-mail message. In yet another embodiment, a rule may indicate that e-mail messages including a predetermined password (thus indicating that the e-mail messages are wanted) are rated with a lower rate than the rate for e-mail messages that do not include the predetermined password.

To this end, it may be determined which rules apply to the e-mail message, based on predetermined criteria. Further, each of the applicable rules may be utilized for determining a rate for the e-mail message. Still yet, the rates determined utilizing the rules may be aggregated for rating the e-mail message.

Furthermore, a rank for the e-mail message is determined, based on the rating, as shown in operation 404. The rank, which may be a numerical value and/or any other indicator capable of being compared to at least one threshold, may be determined by being selected from a plurality of ranks, in one embodiment. Additionally, the rank may indicate a total risk of the e-mail message. For example, each rank may be associated with a range of rates, such that the e-mail message may be assigned a particular rank if the rating of the e-mail message is within the range of rates associated with such rank.

As also shown, the rating and rank of the e-mail message is stored in a database. Note operation 405. In one embodiment, the rating and rank may be stored in the database in association with an identifier of the e-mail message, a checksum of the e-mail message, etc. In this way, the future access to the rating and/or rank of the e-mail message may be provided.

Furthermore, it is determined whether the e-mail rank meets a high risk threshold, as shown in decision 406. The high risk threshold may include any threshold predetermined to indicate that the e-mail message includes a high risk (e.g. of unwanted data, etc.). For example, the high risk threshold may be predetermined by a user to include any number of different ranks, any range of ranks, etc.

If the e-mail rank meets the high risk threshold, user-configurable settings for the high risk threshold are identified. Note operation 408. To this end, a set of settings may be particular to the high risk threshold. Further, such settings are user-configurable, such that any portion of the settings may be configured by a user (e.g. a user of the device via which the e-mail message is to be displayed, etc.).

With respect to the present embodiment, the user-configurable settings may include any settings indicating a manner in which the e-mail message is to be displayed. Just by way of example, the user-configurable settings may indicate a folder under which the e-mail message is to be displayed, whether the e-mail message is to be displayed, a risk indicator to be displayed with the e-mail message, etc.

If the e-mail rank does not meet the high risk threshold, it is determined whether the e-mail rank meets a medium risk threshold, as shown in decision 410. The medium risk threshold may include any threshold predetermined to indicate that the e-mail message includes a medium risk. As an option, the medium risk threshold may be predetermined by a user to include any number of different ranks, any range of ranks, etc.

If the e-mail rank meets the medium risk threshold, user-configurable settings for the medium risk threshold are identified. Note operation 412. Accordingly, a set of settings may be particular to the medium risk threshold. Further, such settings are user-configurable, such that any portion of the settings may be configured by the user.

If the e-mail rank does not meet the medium risk threshold, it is further determined whether the e-mail rank meets a low risk threshold, as shown in decision 414. The low risk threshold may include any threshold predetermined to indicate that the e-mail message includes a low risk. As an option, the low risk threshold may be predetermined by a user to include any number of different ranks, any range of ranks, etc.

If the e-mail rank meets the low risk threshold, user-configurable settings for the low risk threshold are identified. Note operation 416. Thus, a set of settings may be particular to the low risk threshold. Further, such settings are user-configurable, such that any portion of the settings may be configured by the user.

If the e-mail rank does not meet the low risk threshold, user-configurable settings for a default risk are identified, as shown in operation 418. The default risk may include a risk automatically associated with the e-mail message if the rank of the e-mail message is below the low risk threshold. Additionally, the user-configurable settings for the default risk may include any predetermined set of user-configurable settings that are assigned to the default risk.

Still yet, the e-mail message is displayed in an interactive manner based on the identified settings, as shown in operation 420. As noted above, the user-configurable settings identified for the e-mail message based on the rank of such e-mail message may indicate the manner in which the e-mail message is to be displayed. In this way, the e-mail message may be conditionally displayed, displayed in a particular folder, displayed with a particular ranking indicator, color-coded, etc. based on the user-configurable settings identified for the e-mail message.

Further, with respect to the present embodiment, the e-mail message may be displayed in the interactive manner by enabling at least one interactive control for the e-mail message. The interactive control may include a selectable link, icon, etc. displayed in association with the e-mail message, for example. In one embodiment, the interactive control may allow a user viewing the e-mail message to select to view additional information associated with the e-mail message, such as the rank of the e-mail message, characteristics of the e-mail message (e.g. a source, an attachment, etc.) which resulted in the particular rank being determined for the e-mail message, etc.

In another embodiment, the interactive control may allow the user to modify any of the rules utilized to rate the e-mail message, such as allowing the user to modify a rate applied to the e-mail message for a particular predetermined criteria of the e-mail message, etc. In yet another embodiment, the interactive control may allow the user to modify any portion of the user-configurable settings identified for the e-mail message.

Figure 4B:
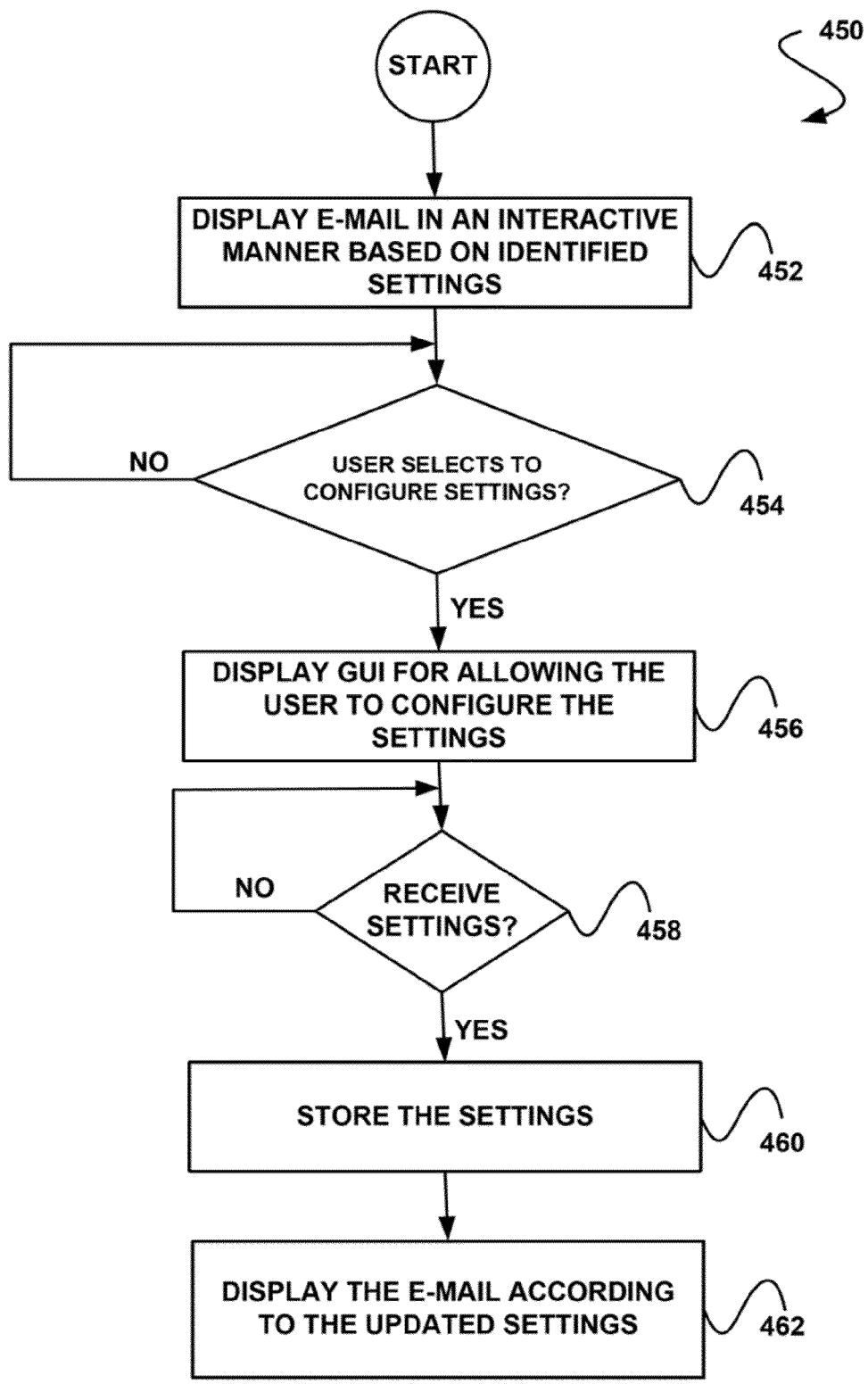
FIG. 4B shows a method for allowing a user to configure settings utilized to display an e-mail message, in accordance with another embodiment.

One example of allowing the user to modify the user-configurable settings is described in more detail with respect to FIG. 4B.

FIG. 4B shows a method 450 for allowing a user to configure settings utilized to display an e-mail message, in accordance with another embodiment. As an option, the method 450 may be carried out in the context of the architecture and environment of FIGS. 1-4A. Of course, however, the method 450 may be carried out in any desired environment. It should also be noted that the aforementioned definitions may apply during the present description.

As shown in operation 452, an e-mail message is displayed in an interactive manner based on user-configurable settings identified for the e-mail message. With respect to the present embodiment, the user-configurable settings may be identified for the e-mail message based on a rank of the e-mail message. For example, the user-configurable settings may be identified for the e-mail message in the manner described above with respect to FIG. 4A.

Additionally, it is determined whether a user selects to configure the user-configurable settings, as shown in decision 454. In one embodiment, the user may select to configure the settings by selecting an interactive control displayed with the e-mail message (e.g. via an e-mail application, etc.). If it is determined that the user does not select to configure the user-configurable settings, the method 450 continues to wait for the user to select to configure the user-configurable settings.

If, however, the user selects to configure the user-configurable settings, a graphical user interface (GUI) is displayed for allowing the user to configure the user-configurable settings. Note operation 456. In one embodiment, the GUI may include a pop-up window displayed on top of a window via which the e-mail message is displayed.

In another embodiment, the GUI may include input fields capable of being utilized by the user to configure the user-configurable settings.

Further, it is determined whether settings are received via the GUI, as shown in decision 458. In one embodiment, the settings may be received in response to the user inputting the settings. In another embodiment, the settings may be received in response to the user selecting a save option located on the GUI for saving settings input to the GUI by the user.

If it is determined that settings are not received, the method 450 continues to wait for such settings to be received. The method 450 may wait until the user closes the GUI, for example. If, however, it is determined that settings are received, the settings are stored. Note operation 460. In one embodiment, the settings may be stored in a database.

In another embodiment, the settings may be stored in association with the risk threshold (e.g. high risk threshold, medium risk threshold, low risk threshold, default risk, etc.) met by the rank of the e-mail message. In this way, user-configurable settings identified for such risk threshold may be updated by the user and applied to other e-mail messages (e.g. subsequently received e-mails, etc.) with the associated rank.

Moreover, the e-mail is displayed according to the updated settings, as shown in operation 462. For example, the setting stored in the database may be utilized for determining a manner in which the e-mail message is to be displayed. The e-mail may be displayed based on the updated settings in response to the storage of the settings, after a predetermined amount of time, etc.

Table 1 illustrates various examples of user-configurable settings which may be updated via the GUI. It should be noted that such user-configurable settings are set forth for illustrative purposes only, and thus should not be construed as limiting any manner.

Table 1

1. If the rank of the e-mail message meets the high risk threshold, move the e-mail message from an inbox to a folder designated for storing high risk e-mail messages.
2. If the rank of the e-mail message meets the medium risk threshold, move the e-mail message from an inbox to a folder designated for storing medium risk e-mail messages
3. If the rank of the e-mail message meets the low risk threshold, move the e-mail message from an inbox to a folder designated for storing low risk e-mail messages
4. Rate e-mail messages from source 'A' with a zero rating
5. Rate e-mail messages that include the word "Bank" with high rating value '100'
6. Rate e-mail messages with a .exe attachment with high rating value '100'

Figure 5:
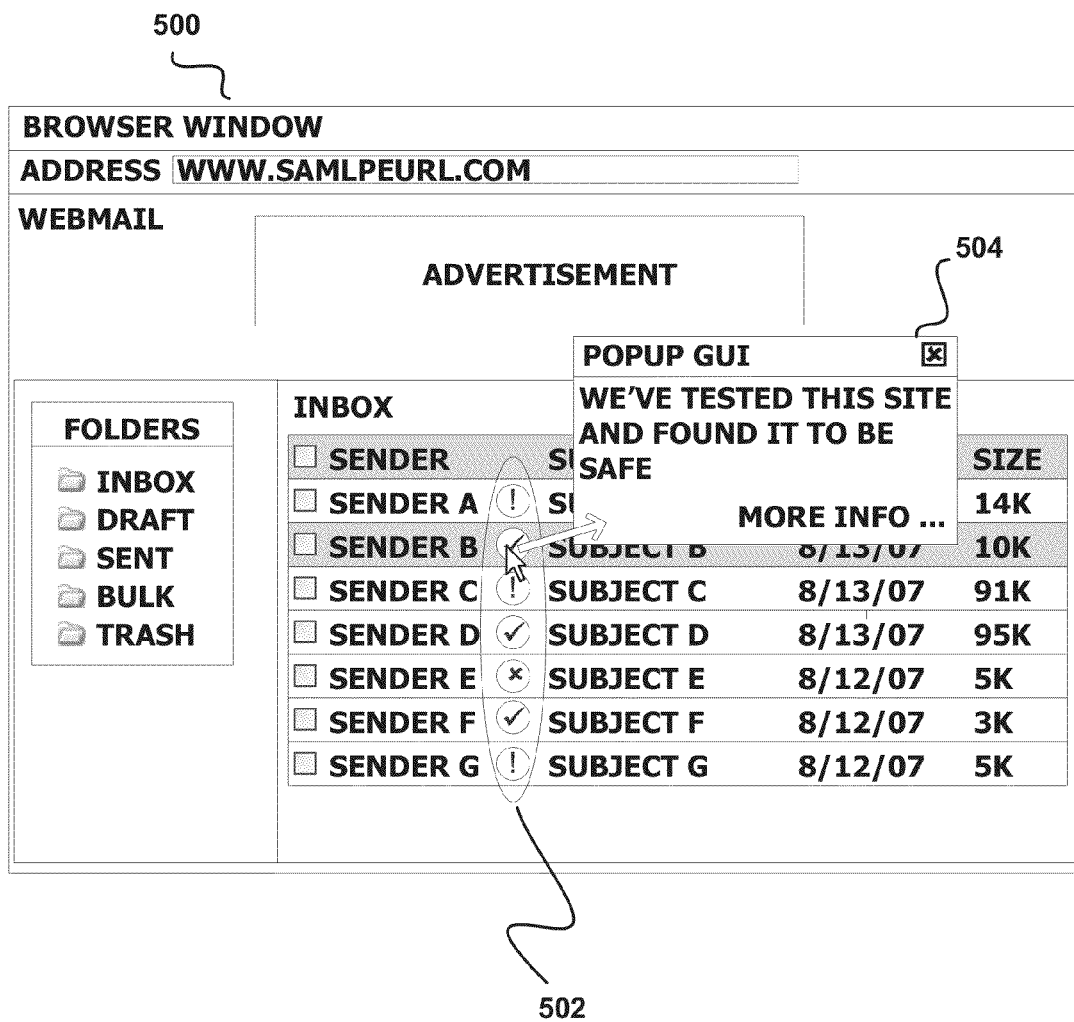
FIG. 5 shows a graphical user interface (GUI) for allowing a user to configure the manner in which an e-mail is displayed, in accordance with yet another embodiment.

FIG. 5 shows a GUI 500 for allowing a user to configure the manner in which an e-mail is displayed, in accordance with yet another embodiment. As an option, the GUI 500 may be carried out in the context of the architecture and environment of FIGS. 1-4. Of course, however, the GUI 500 may be carried out in any desired environment. Again, it should be noted that the aforementioned definitions may apply during the present description.

As shown, the GUI 500 displays a plurality of e-mail messages. With respect to the present embodiment, each of the e-mail messages is displayed by displaying a plurality of identifiers associated with such e-mail message. As shown, the identifiers may include a subject, source, receipt date, size, etc. of the e-mail message.

For each e-mail message, an indicator of risk 502 associated with such e-mail is also displayed. The indicator of risk 502 may include an icon indicating a risk that the e-mail message includes unwanted data, is associated with unwanted data, etc. In one embodiment, the indicator of risk 502 may be determined based on a rating of the e-mail message. For example, user-configurable settings particular to the rating of the e-mail message may identify the indicator of risk 502 to be displayed with respect to the e-mail message.

Upon selection of an indicator of risk 502 associated with an e-mail message, a pop-up GUI 504 is displayed, as shown. The pop-up GUI 504 may present any information associated with the message, such as the characteristics of the e-mail message (e.g. source, etc.) which resulted in the particular indicator of risk 502 being displayed in association therewith. As an option, the pop-up GUI 504 may display each rating applied to each of a plurality of predetermined characteristic of the e-mail message.

As another option, the pop-up GUI 504 may display an interactive control for allowing the user viewing the pop-up GUI 504 to configure the user-configurable settings based on which the e-mail message is displayed. For example, the pop-up GUI 504 may display the user-configurable settings, display input fields for allowing the user-configurable settings to be modified, etc. In this way, the user may be allowed to configure the manner in which an e-mail is displayed, via the GUI 500 and optionally the pop-up GUI 504.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code to identify an electronic mail message at a device;
   computer code to calculate a numerical risk value of the electronic mail message based on predefined criteria established by a recipient;
   computer code to assign one of a plurality of risk rankings to the electronic mail message based at least in part on the calculated numerical risk value, each risk ranking of the plurality of risk rankings corresponding to a risk value range;
   computer code to display the electronic mail message and a risk indicator in a user-configurable manner according to the assigned risk ranking;
   computer code to detect a selection of the risk indicator; and
   computer code to display one or more characteristics of the electronic mail message that resulted in the assigned risk ranking in response to the detected selection.

2. The computer program product of claim 1, wherein the electronic mail message includes an unrated electronic mail message.

3. The computer program product of claim 1, wherein the computer code to identify the electronic mail message comprises computer code to identify the electronic mail message in response to receipt of the electronic mail message at the device.

4. The computer program product of claim 1, wherein the computer code to identify the electronic mail message includes computer code to identify the electronic mail message based on a periodic scan for unrated electronic mail messages.

5. The computer program product of claim 1, wherein the computer code to calculate the numerical risk value of the electronic mail message based on the predefined criteria comprises computer code to evaluate a source of the electronic mail message.

6. The computer program product of claim 5, wherein the computer code to evaluate the source of the electronic mail message comprises computer code to determine whether the source of the electronic mail message is trusted.

7. The computer program product of claim 6, wherein the computer code to determine whether the source of the electronic mail message is trusted comprises computer code to determine whether the source is included in a predefined contacts list.

8. The computer program product of claim 1, wherein the computer code to calculate the numerical risk value of the electronic mail message based on the predefined criteria comprises computer code to evaluate a digital signature associated with the electronic mail message.

9. The computer program product of claim 1, wherein the computer code to calculate the numerical risk value of the electronic mail message based on the predefined criteria comprises computer code to evaluate content of the electronic mail message.

10. The computer program product of claim 9, wherein the computer code to evaluate the content comprises computer code to evaluate links included in the electronic mail message.

11. The computer program product of claim 1, wherein the computer code to calculate the numerical risk value of the electronic mail message based on the predefined criteria comprises computer code to evaluate an attachment of the electronic mail message.

12. The computer program product of claim 11, wherein the computer code to evaluate the attachment comprises computer code to evaluate a type of the attachment.

13. The computer program product of claim 12, wherein the computer code to evaluate the type of the attachment comprises computer code to determine whether the attachment includes an executable file.

14. The computer program product of claim 1, further comprising computer code to determine a numerical risk value for each predefined criteria.

15. The computer program product of claim 14, wherein the computer code to calculate the numerical risk value of the electronic mail message based on the predefined criteria comprises computer code to aggregate the determined numerical risk value for each of the predefined criteria.

16. The computer program product of claim 1, wherein the computer code to display the electronic mail message in the user-configurable manner comprises computer code to display the electronic mail message in a folder corresponding to the assigned risk ranking.

17. A method, comprising:
   identifying an electronic mail message at a device of a recipient;
   calculating a numerical risk rating of the electronic mail message based on predefined criteria established by the recipient;
   assigning one of a plurality of risk rankings to the electronic mail message based, at least in part, on the numerical risk rating, each risk ranking corresponding to a risk rating range;
   displaying the electronic mail message and a corresponding risk indicator in a user-configurable manner according to the assigned risk ranking;
   detecting a selection of the risk indicator; and
   displaying one or more characteristics of the electronic mail message that resulted in the assigned risk ranking in response to the detection of the selection.

18. A computer system, comprising:
   a display element;
   a memory operatively coupled to the display element; and
   a processor operatively coupled to the display element and memory, the processor adapted to execute program code stored in the memory to:
      identify an electronic mail message at the computer system,
      calculate a numerical risk rating of the electronic mail message based on predefined criteria established by a recipient,
      display, on the display element, the electronic mail message and a corresponding risk indicator in a user-configurable manner according to the assigned risk ranking, the risk indicator selectable by the recipient to display one or more characteristics of the electronic mail message that resulted in the assigned risk ranking,
      detect a selection of the risk indicator, and
      display, on the display element, one or more characteristics of the electronic mail message that resulted in the assigned risk ranking in response to the detection of the selection.

* * * * *